Oct. 19, 1965 P. A. NEETESON 3,213,378
CIRCUIT FOR SWITCHING OUT A BLOCK SIGNAL WITHOUT
DISTORTION AT ANY ARBITRARY MOMENT
Filed Aug. 16, 1962

INVENTOR
PIETER A. NEETESON
BY
Frank R. Trifari
AGENT 3,213,378

CIRCUIT FOR SWITCHING OUT A BLOCK SIGNAL WITHOUT DISTORTION AT ANY ARBITRARY MOMENT

Pieter Adrianus Neeteson, Eindhoven, Netherlands, assignor to North American Philips Company, Inc., New York, N.Y., a corporation of Delaware Filed Aug. 16, 1962, Ser. No. 217,405
Claims priority, application Netherlands, Aug. 17, 1961, 268,353
4 Claims. (Cl. 328—164)

This invention relates generally to circuits adapted to switch out a block signal without distortion at any arbitrary moment.

The need for such a circuit may arise in a circuit arrangement for handling information which is controlled or fed by a block signal delivered by a block signal generator or by a pulse series derived from such a signal. In such a circuit arrangement it may be necessary at some time to switch out the block signal, for example, for disabling the arrangement, or for actuating an alarm circuit which signals the dropping out of the block signal in order to test whether the alarm circuit itself operates properly. It may then be necessary to prevent the block signal from being broken off during a positive block since this block would then be shortened (and hence distorted); this could give rise to incorrect functioning of the information-handling circuit. If the block signal is switched out manually, however, there is a risk that this might happen just during a positive block of the signal.

A primary object of the invention is to provide a circuit in which block signals may be switched out at any arbitrary moment without distortion.

According to one aspect of the invention, a circuit is provided which includes means for producing needle-like pulses corresponding to the leading edges and trailing edges of the block signal. Means are provided for applying the needle-like pulses corresponding to the leading edges of the block signal to the 1-inputs of a first and a second flip-flop with such a polarity that the flip-flops jump to the state "1" upon receipt of such a pulse. Means are also provided for applying the needle pulses corresponding to the trailing edges of the block signal to the 0-input of the first flip-flop with such a polarity that this flip-flop jumps to the state "0" upon receipt of such a pulse; the means for applying the needle pulses corresponding to the leading edges of the block signal to the 1-input of the first flip-flop include a switch which may be made non-conducting at any arbitrary moment; the circuit also includes means for producing needle pulses from the edges of the signal delivered by the 0-output of the first flip-flop which correspond to the trailing edges of the original block signal, together with means for applying these needle pulses to the 0-input of the second flip-flop; finally, means are provided for deriving an output signal from the output terminals of the second flip-flop.

In order that the invention may be readily carried into effect, it will now be described in detail, by way of example, with reference to the accompanying diagrammatic drawing, in which.

Figure 1:
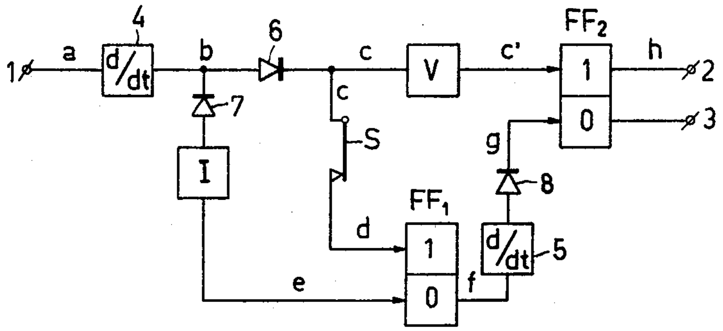
FIGURE 1 shows a first embodiment of the invention.

Referring to FIGURE 1, the input terminal of a switching circuit according to the invention is designated by reference numeral 1 and two output terminals of this circuit are designated by reference numerals 2 and 3. The block signal to be switched out or in without distortion is applied to the input terminal 1. This signal will appear at any one of the two output terminals 2 and 3 as long as the switching circuit is in its conducting state but will appear at neither of the output terminals 2 and 3 when the switching circuit is in its non-conducting state. The two output terminals 2 and 3 deliver block signals in opposite phases so that in many applications only one output terminal will be sufficient. The figure further shows a first flip-flop $FF_1$, a second flip-flop $FF_2$, a manually-operable switch S, two differentiating circuits 4 and 5, a delay circuit V, an inverter I (i.e., a circuit converting negative pulses into positive pulses and conversely), and diodes 6, 7 and 8; the latter may be any circuit elements which pass a voltage or current in only one direction.

The flip-flops may be Eccles-Jordan circuits equipped with transistors, if desired. The only essential requirement is that they be bistable circuits each having two inputs and two outputs. The operation of flip-flops is well-known in the art; the states of a flip-flop are indicated by "0" and "1." The inputs of a flip-flop may be distinguished as a "0" input and a "1" input. If a voltage or current is applied to the "0" input, the flip-flop jumps from the state "1" to the state "0" if it occupied the state "1" and remains in the state "0" if it was already in this state. If a voltage or current is applied to the "1" input, the flip-flop jumps from the state "0" to the state "1" if it occupied the state "0" and remains in the state "1" if it was already in this state. The outputs may similarly be distinguished as a "0" output and a "1" output. If the flip-flop is in the state "0," the "0" output delivers a voltage or current, but the "1" output does not deliver a voltage or current. If the flip-flop occupies the state "1" the reverse is the case.

Figure 2:
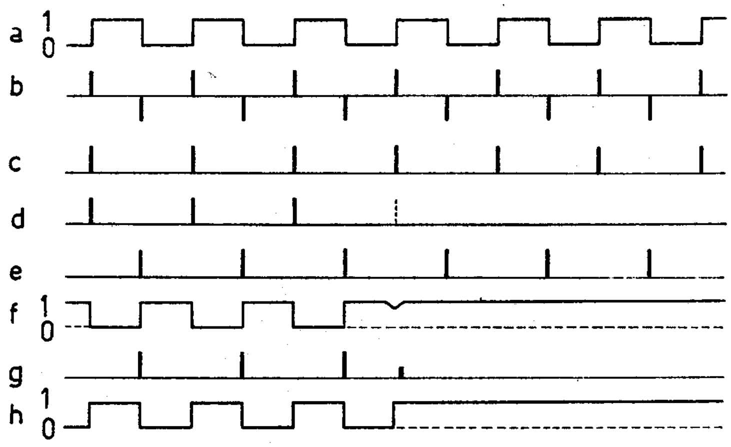
FIGURE 2 shows the signals occurring in the circuit of FIGURE 1.

The circuit shown in FIG. 1 operates as follows. The input terminal 1 receives the block signal which is to be switched out without distortion. This signal is shown as curve *a* in FIGURE 2. This signal is differentiated in differentiating circuit 4, resulting in a pulse series *b* consisting of alternately positive and negative needle-like pulses. The term "needle-like pulses" is to be understood herein to mean pulses having a duration considerably shorter than the recurrence period. The positive pulses of the pulse series *b* are passed by the diode 6, resulting in a pulse series *c*. This pulse series is applied through switch S to the "1" input of the flip-flop $FF_1$ and through delay circuit V to the "1" input of the flip-flop $FF_2$. This input of the flip-flop $FF_2$ thus receives the pulse series *c'* which is the same as but slightly delayed with respect to the pulse series *c*. The negative pulses of the pulse series *b* are passed by the diode 7 and inverted by the inverter I into positive pulses, resulting in a pulse series *e*. The latter pulse series is applied to the "0" input of the flip-flop $FF_1$. As long as switch S is closed and the flip-flop $FF_1$ thus receives the pulse series *c* and *e*, said flip-flop changes-over in synchronism with the incoming block signal *a*, reproducing the signal at its two outputs in two opposite phases. Curve *f* shows the block signal delivered by the "0" output of the flip-flop $FF_1$, which is in phase opposition to the incoming block signal *a*. The signal *f* is differentiated in differentiating circuit 5, and of the resulting pulse series the positive pulses are passed by the diode 8 and applied to the "0" input of the flip-flop $FF_2$. The latter thus receives the pulse series *g* at its "0" input and the pulse series *c'* at its "1" input. As long as switch S is closed, the flip-flop $FF_2$ also changes-over in synchronism with the incoming block signal *a*, reproducing it at its two outputs in phase and in phase opposition respectively. Curve *h* shows the block signal delivered by the "1" output of the flip-flop $FF_2$, which is an exact reproduction of the incoming block signal *a*.

Let it be assumed that switch S is opened at an instant such that one of the positive pulses of pulse series *c* is passed with distortion (the fourth pulse, shown in broken line, in curve *d*). The "1" input of the flip-flop $FF_1$ then receives the pulse series *d* which breaks off with a distorted pulse. The "0" output of said flip-flop then delivers a signal *f* which shows a small indentation at the moment of the distorted pulse, but which does not return to the value 0, at least as long as the flip-flop $FF_1$ is not completely changed-over by the distorted pulse. Since the flip-flop then no longer receives pulses at its "1" input, it remains in the state "0." The pulse series passed by the diode 8 contains at this moment a weak positive pulse originating from the leading edge of the indentation in signal *f*. The flip-flop $FF_2$ thus receives at this moment a weak pulse at its "0" input and a pulse of normal amplitude at its "1" input and will therefore normally jump to the state "1." Thereafter the flip-flop $FF_2$ no longer receives pulses at its "0" input and thus remains in the state "1." The flip-flop $FF_2$ thus delivers a block signal *h* which breaks off without distortion. Even if the switch S is opened at the most unfavorable moment, that is, at the moment when the incoming block signal has a leading edge, the output signal delivered by the flip-flop $FF_2$ is prevented from breaking off with a distorted block. The reason for this is as follows: The pulse series *d* in such a case contains a distorted pulse at the moment when switch S is opened. If this pulse is too weak for completely changing-over the flip-flop $FF_1$ the process is as described above. However, if the pulse is strong enough for completely changing-over the flip-flop $FF_1$ the signal *f* has no indentation at this moment, but has a trailing edge which is converted by differentiating circuit 5 into a negative pulse which is not transmitted by the diode 8. The signal *h* then breaks off one recurrence period later, but again without distortion.

The operation of the circuit may be rendered more reliable by proportioning the whole so that the pulses of pulse series *c* have a strength such as to neutralize with certainty the influence of the strongest interference pulse that may occur in the pulse series *g*. For the sake of simplicity, no allowance has been made in the foregoing description for the delay encountered by the signals via the path formed by inverter 7, flip-flop $FF_1$, differentiating circuit 5 and diode 8. However, if necessary, a delay circuit having a delay equal to that of the said path may be included in the line between the diode 6 and the "1" input of flip-flop $FF_2$. In fact, such a delay circuit completely neutralizes the distortion in output signal *h* resulting from the delay encountered in this path. The relevant delay circuit is indicated by V in FIGURE 1. However, it is usually not required for recurrence frequencies of a few kilocycles per second or less.

Figure 3:
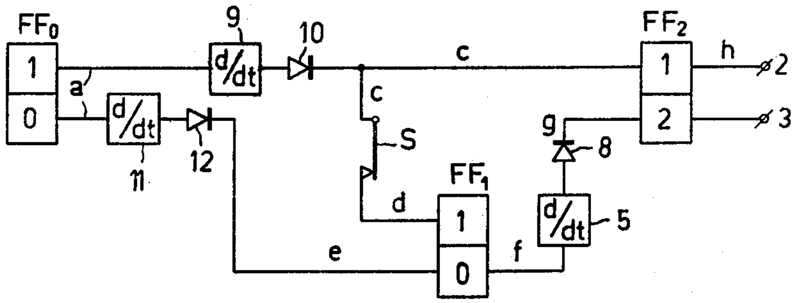
FIGURE 3 shows a second embodiment of the invention.

It may occur that the block signal to be switched out is delivered to the circuit through two wires in phase and in phase opposition. In such a case use may be made of the circuit shown in FIGURE 3. In this figure it is assumed that the block signal is delivered by a flip-flop $FF_0$ which is controlled by a crystal oscillator. The flip-flop $FF_0$ and the crystal oscillator controlling it (not shown in FIG. 3) are therefore not part of the circuit according to the invention. Each of the two pulse series *c* and *e* (FIGURE 2) may be produced by means of a differentiating circuit and a diode. In FIGURE 3 these are a differentiating circuit 9 and a diode 10 for the pulse series *c* and a differentiating circuit 11 and a diode 12 for the pulse series *e*. The circuit of FIGURE 3 is otherwise identical in structure and function with that shown in FIGURE 1.

It is to be understood that the above-described arrangements are illustrative of the application of the principles of the invention. Numerous other arrangements may be devised by those skilled in the art without departing from the spirit and scope of the invention.

What is claimed is:

1. A circuit for switching out a block signal without distortion at any arbitrary moment, comprising: means for producing needle pulses corresponding to the leading edges and trailing edges of the block signal, first and second flip-flops, means for applying the needle pulses corresponding to the leading edges of the block signal to the "1" inputs of said first and second flip-flops with a polarity such that each flip-flop assumes the state "1" upon application of such a needle pulse, means for applying the needle pulses corresponding to the trailing edges of the block signal to the "0" input of the first flip-flop with a polarity such that said first flip-flop assumes the state "0" upon application of such a needle pulse, the means for applying the needle pulses corresponding to the leading edges of the block signal to the "1" input of said first flip-flop including a normally closed switch adapted to be opened at any arbitrary moment, means for producing additional needle pulses from the edges of the signal delivered by the "0" output of said first flip-flop which correspond to the trailing edges of the block signal, means for applying said additional needle pulses to the "0" input of the second flip-flop, and means for deriving an output signal from the output terminals of the second flip-flop.

2. A circuit as defined in claim 1, wherein each of said means for producing needle pulses comprises a differentiating circuit.

3. A circuit for switching out a block signal without distortion at any arbitrary moment, comprising: means for producing needle pulses corresponding to the leading edges and trailing edges of the block signal, first and second flip-flops, means for applying the needle pulses corresponding to the leading edges of the block signal to the "1" inputs of said first and second flip-flops with a polarity such that each flip-flop assumes the state "1" upon application of such a needle pulse, said means including a delay circuit for delaying the application of the needle pulses to said "1" input of said second flip-flop, means for applying the needle pulses corresponding to the trailing edges of the block signal to the "0" input of the first flip-flop with a polarity such that said first flip-flop assumes the state "0" upon application of such a needle pulse, the means for applying the needle pulses corresponding to the leading edges of the block signal to the "1" input of said first flip-flop including a normally closed switch adapted to be opened at any arbitrary moment, means for producing additional needle pulses from the edges of the signal delivered by the "0" output of said first flip-flop which correspond to the trailing edges of the block signal, means for applying said additional needle pulses to the "0" input of the second flip-flop, and means for deriving an output signal from the output terminals of the second flip-flop.

4. A circuit as defined in claim 3 wherein each of said means for producing needle pulses comprises a differentiating circuit.

References Cited by the Examiner

UNITED STATES PATENTS

| | | | |
|---|---|---|---|
| 2,794,123 | 5/57 | Younker | 328—55 |
| 2,880,317 | 3/59 | Vaughan | 328—195 |
| 2,906,892 | 9/59 | Jones | 307—88.5 |

ARTHUR GAUSS, *Primary Examiner.*